Jan. 21, 1969
R. C. ROLLETTE
3,422,792
APPARATUS FOR APPLYING COLOR COATING AND
REFLECTIVE GLASS BEADS TO STONE
Filed April 18, 1968
Sheet 3 of 4
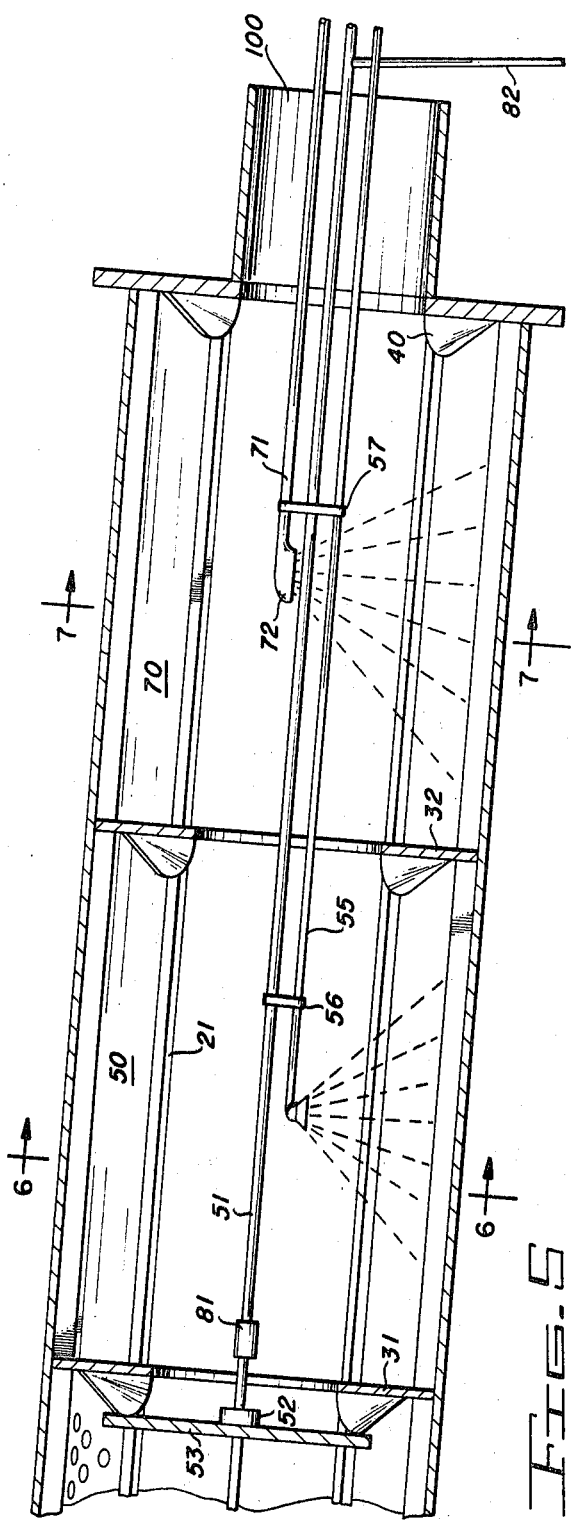
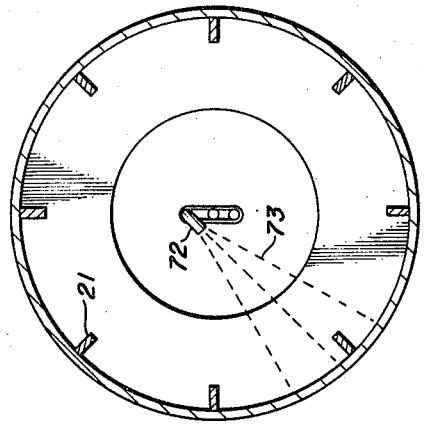
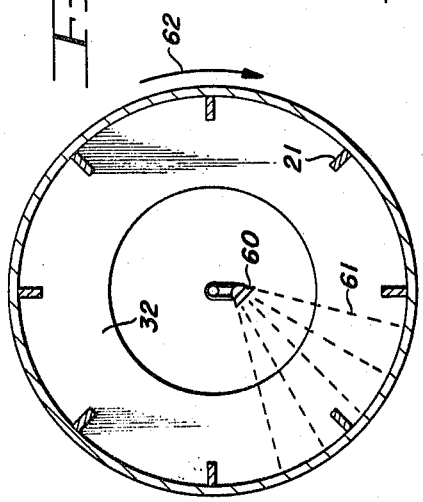
INVENTOR.
ROBERT C. ROLLETTE
BY
*Drummond & Cahill*
ATTORNEYS

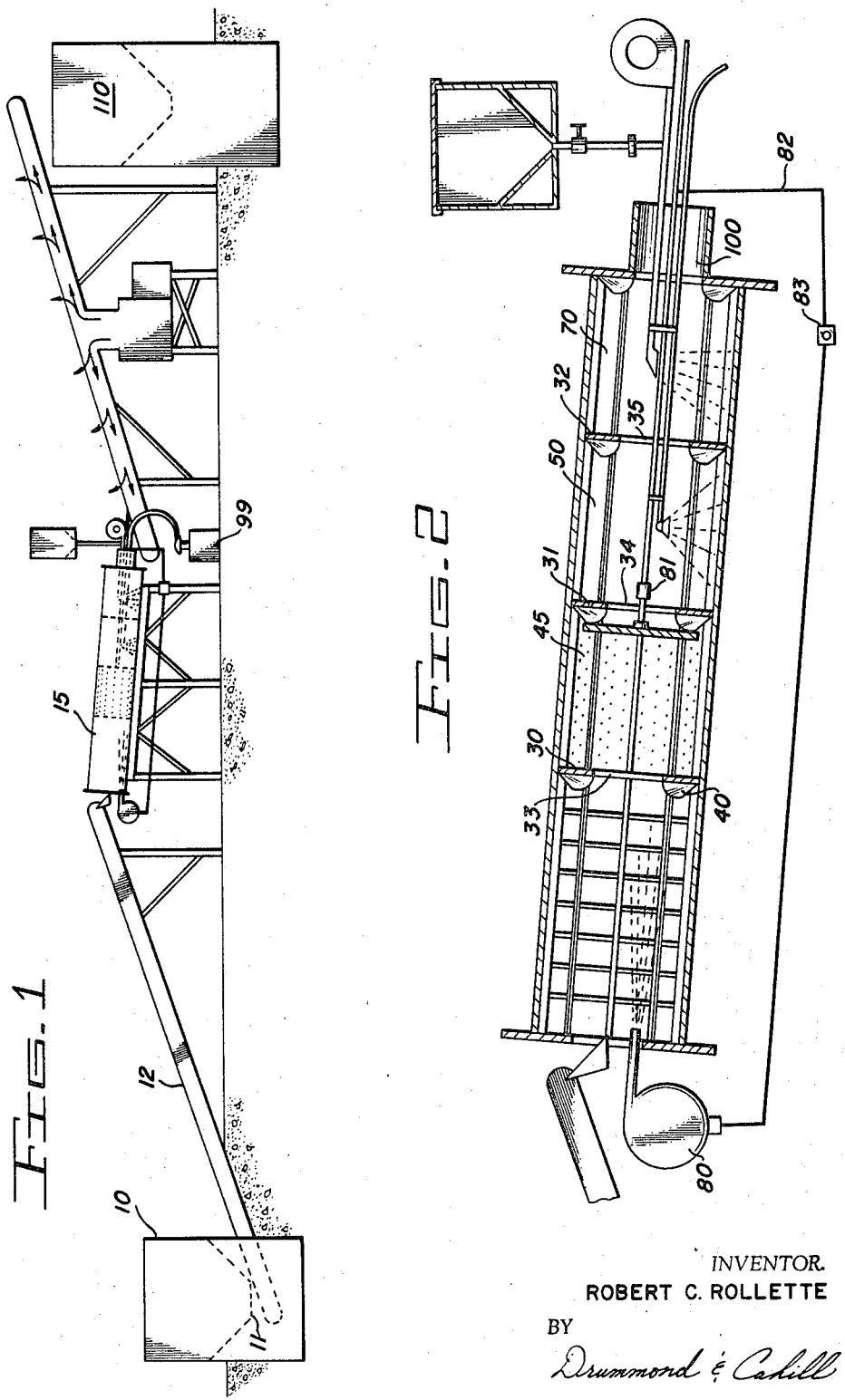

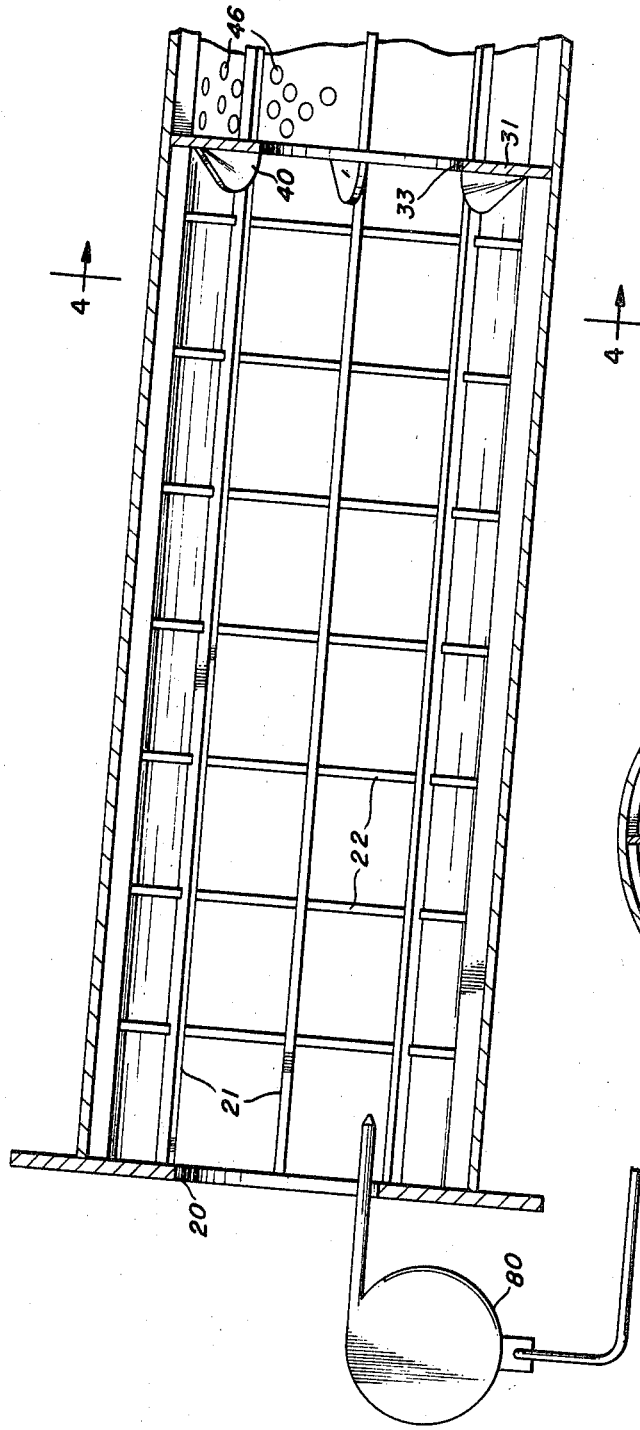
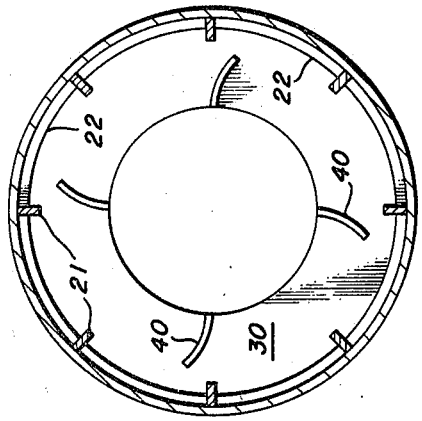

INVENTOR.
ROBERT C. ROLLETTE

United States Patent Office 3,422,792
Patented Jan. 21, 1969

3,422,792
APPARATUS FOR APPLYING COLOR COATING
AND REFLECTIVE GLASS BEADS TO STONE
Robert C. Rollette, 216 Blackhawk Blvd.,
South Beloit, Ill. 61080
Continuation-in-part of application Ser. No. 437,759,
Mar. 8, 1965. This application Apr. 18, 1968, Ser.
No. 722,339
U.S. Cl. 118—5                                     6 Claims
Int. Cl. B05c 11/12, 5/00; B05b 7/00

ABSTRACT OF THE DISCLOSURE

A conveyor system lifts raw stone from a storage area into a compartmentalized rotating drum wherein the stone is tumbled, dried and heated. The stone passes from the drying and heating compartments into a painting compartment where it is sprayed with a color coating; the stone with the color coating thereon is passed to another compartment in the rotating drum wherein it is sprayed with glass beads which adhere to the coating. The colored and beaded stone passes on to a conveyor where it is dried and delivered to a storage area.

---

This application is a continuation-in-part of application Ser. No. 437,759, filed Mar. 8, 1965.

This invention pertains to apparatus for coating stone and, more particularly, to apparatus for receiving raw stone and applying a color coating and glass beading thereto. The utilization of colored stone for decoration has become well established in many areas of the country. Substantial problems arise, however, in both the area of applying the coating to the stone as well as the durability of the coating when the stone is in place and subjected to weathering. The application of an even coating properly bonded to the stone is difficult; prior art apparatus often produces colored stone wherein the coating is poorly bonded and is unevenly applied. For example, permitting the existence of "voids" in the coating will frequently cause the rapid deterioration of the bond between the coating and the stone by permitting moisture access between the stone and the coating.

The utilization of reflective glass beads in highway environments has been recognized as a significant improvement in highway safety. The utilization of beads has heretofore largely been restricted to the inclusion of such beads in paints and painting compounds. When prior art attempts were made to apply glass beading to colored stone, it was found that the colored coating transferred with the glass beading to the extent that the reflective characteristics of the beading were drastically reduced. Subsequently, complicated processes were developed for achieving the adhesion of glass beading to stone; however, such processes frequently were very expensive to practice and in some instances could produce only a limited, and sometimes only one, range of colors.

It is therefore an object of the present invention to provide apparatus to apply coloring and glass beading to stone.

It is another object of the present invention to provide a means for processing stone from a raw state to a colored and beaded state.

It is another object of the present invention to provide apparatus that will permit the application of any of a variety of colors to stone while permitting the application of reflective glass beads thereto.

These and other objects of the present invention will become apparent to those skilled in the art as the description thereof proceeds.

Briefly, in accordance with the embodiment chosen for illustration, a conveyor transports raw stone from the storage area to a compartmentalized rotating drum. The drum axis is inclined slightly from horizontal so that when the raw stone is introduced at one end thereof, it will migrate to the opposite end of the drum through the respective compartments. The raw stone enters into a drying and heating compartment into which hot air is introduced. The tumbling action is enhanced by the utilization of longitudinal ribs extending the length of the drum interior. The stone passes to a second chamber where the temperature of the stone is adjusted to a predetermined value. The stone passes into a painting chamber where it is tumbled past a coating spray which insures that all surfaces of the stone are coated. The temperature of the stone and the temperature of the paint spray chamber are controlled so that as the coated stone passes from the chamber into the glass beading chamber, the coating is only partially dry. In the glass beading chamber, the partially dried coated stones are tumbled through a reflective glass bead spray wherein the glass beads adhere to the partially dried coating and become embedded in the coating. The coated and beaded stone pass from the rotating drum onto a drying conveyor where hot hair dries the coating, thereby firmly "fixing" the beads in place.

The present invention may more readily be described by reference to the accompanying drawings, in which:

FIGURE 1 is a side elevational schematic view of the apparatus of the present invention.

FIGURE 2 is an enlarged sectional view of a portion of the apparatus of FIGURE 1.

FIGURE 3 is a sectional view, greatly enlarged, of the first compartment of the rotating drum shown in FIGURE 1.

FIGURE 4 is a cross-sectional view of FIGURE 3 taken along line 4—4.

FIGURE 5 is a sectional view, greatly enlarged, of a portion of the rotating drum of FIGURE 1 showing the paint spray and glass bead spray compartments.

FIGURE 6 is a cross-sectional view of FIGURE 5 taken along line 6—6.

FIGURE 7 is a cross-sectional view of FIGURE 5 taken along line 7—7.

Figure 8:
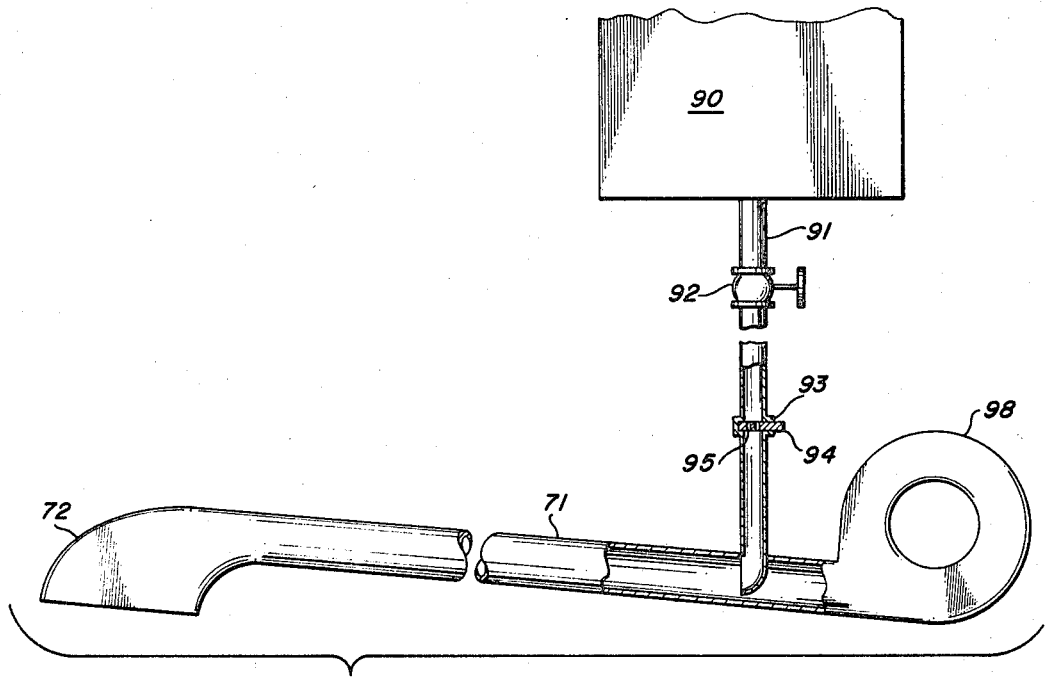
FIGURE 8 is an enlarged view of the glass bead supply system of FIGURE 1.
Figure 9:
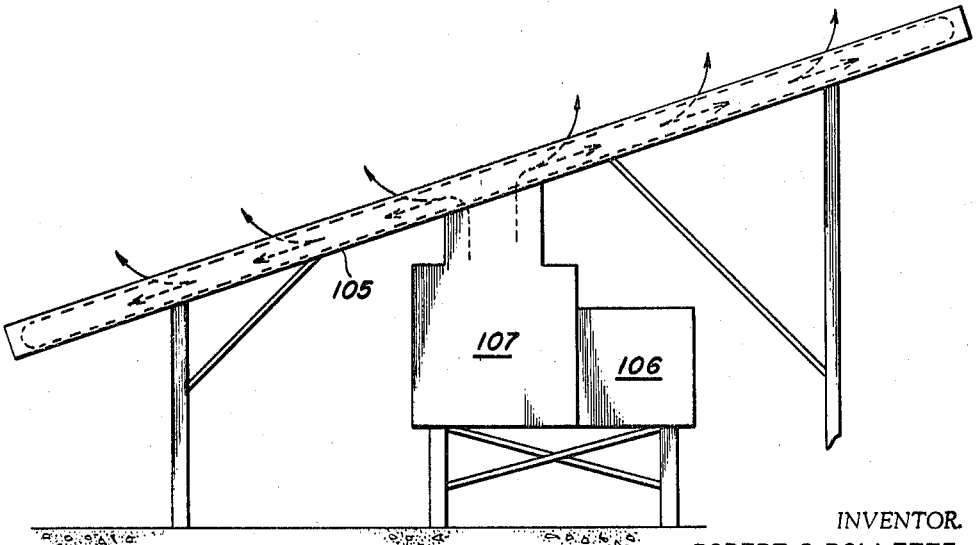
FIGURE 9 is an enlarged view of the drying conveyor of FIGURE 1.

Referring now to the drawings, a raw stone storage area 10 is shown and is schematically represented as a hopper for delivering stone from the bottom 11 thereof onto a feed conveyor 12. The conveyor transports the raw stone from the storage area 10 to a rotating compartmentalized drum 15. The drum 15 has an opening 20 at one end thereof for receiving raw stone from the conveyor 12. The drum includes a plurality of longitudinally extending ribs 21 circumferentially spaced about the interior of the drum by spacing bars 22. The ribs 21 facilitate the tumbling action imparted to the stone by the rotating drum. The drum 15 may be rotated by any convenient means, the details of which are so well known as to militate against the necessity for description here.

The drum is separated into compartments by discs 30, 31, and 32, each of which includes an opening 33, 34, and 35 respectively axially therein. It may be seen that since the drum is inclined from horizontal, as the stone is tumbled and reaches one of the discs 30–32, it will tend to fall through the axial openings in the disc. To facilitate the passage of the stone from one compartment to the other, lifters 40 are secured to each of the discs 30–32 immediately "upstream" from the disc. These lifters assure the passage of the stone from one compartment to the next in a more efficient manner. The second compartment 45 includes a plurality of holes 46 positioned in the periphery thereof. These holes are provided to permit hot drying air to escape from the drum, but are too small to permit the escape of the stone. The third chamber 50 includes a longitudinally extending, axially positioned rod 51 which is journalled in a bearing 52 which, in turn, is secured to a cross-bar 53 welded to the lifters attached to the disc 31. The rod 51 therefore does not rotate with the drum 15. A coating supply tube 55 is attached to the rod 51 by hangers 56 and 57. A spray head 60 is secured to the end of the coating supply tube 55 and is aimed to direct a fan-shaped spray as shown at 61 in FIGURE 6. The fan-shaped spray is directed to the left of vertical and slightly below horizontal as shown in FIGURE 6; the directing of the fan-shaped spray in this manner permits the efficient coating of the stone by subjecting the stone to the spray as the stone falls through the spray. As may be seen in FIGURE 6, when the drum is rotating in the direction shown by the arrow 62, the stone will be lifted through the spray and will subsequently continue to be lifted until it falls from contact with the interior surface of the drum and will fall directly through the spray.

The fourth chamber 70 receives the coated stone from the chamber 50. The chamber 70 also contains the axially extending rod 51 which is utilized as a support for bead supply tube 71. The bead supply tube 71 terminates in an elongated spray head 72 for directing a fan-shaped spray of glass beads such as shown at 73 in FIGURE 7 in a direction to the left of vertical and slightly below horizontal in a manner similar to the coating spray. The stone with the "tacky" coating thereon therefore tumbles through the glass bead spray where the glass beads impinge on the soft coating and become embedded therein (but do not become completely covered by the coating).

The raw stone is dried and heated by the application of a hot air blower such as schematically shown at 80 which introduces hot air into the first compartment of the drum. The hot air escapes through the openings 46 in the compartment 45; the stone at the exit end of the compartment 45 should be at the appropriate temperature so that the coating will properly bond to the stone surface. To control the temperature of the stone as it passes into the coating spray chamber 50, a temperature-sensitive device 81 is mounted on the rod 51 in a position to sense the temperature of the stone being admitted to the chamber 50. The temperature-sensitive device is connected through the interior of the rod 51 and by conductor 82 to a control shown schematically at 83. The control 83 may control the temperature and/or volume of hot air being provided by the blower 80. In this manner, the temperature of the stone is carefully controlled immediately prior to the application of the color coating. When the apparatus is in operation, the control of the temperature of the stone in chamber 50 will automatically control the condition of the color coating as the coated stone leaves the chamber 50 and passes to the chamber 70. It may be seen that the condition of the color coating is thus inherently controlled to provide the proper "tacky" surface for the application of glass beads thereto.

The glass beads are stored in a storage bin 90 and are supplied through a conduit 91 and a valve 92 to a regulating valve 93. The regulating valve 93 may take any of a variety of forms; it has been found that the utilization of a simple slide plate 94 having a calibrated opening 95 therein is sufficient to control the volume of glass beads being delivered from the storage bin 90. The conduit 91 terminates at the interior of the glass bead supply tube 71 and is directed "downstream" thereof. A blower 98 is connected to the end of the tube 71 and provides a predetermined volume of air such that the air passing the end of the conduit 91 "captures" the glass beads which are then borne by the air stream to the glass bead spray head 72. The glass beads are effectively and efficiently carried by the air stream and the volume of air utilized may be adjusted in accordance with the rate at which the apparatus is applying a coating and beading as well as the size of the glass beads. The present apparatus has been found to effectively coat stone having a size sufficient to be retained on a quarter-inch screen and pass a three-quarter inch screen; further, the glass beading utilized has been a mixture of bead sizes, 100% of which pass through a 50-mesh screen, 80% to 100% pass through an 80-mesh screen, 25% to 75% pass through a 100-mesh screen, and up to 12% pass through a 200-mesh screen. The coating utilized has been a water-base composition that is applied at a temperature of about 80° F. to about 100° F. The coating composition is supplied to the coating supply tube 55 by any convenient and commercially available spray apparatus, such as schematically shown in FIGURE 1 at 99.

After the glass beads have been applied to the stone, the stone is lifted to a cylindrical extension 100 secured to the lower end of the rotating drum 15. The extension 100 efficiently directs the coated and beaded stone onto a drying conveyor 105. The drying conveyor may take any of a variety of forms, such as the one described in patent application Ser. No. 437,759, filed Mar. 8, 1965, by the present applicant. An air heater 106 heats ambient air which is subsequently directed by a blower 107 into the conveyor 105 where the hot air is directed up through the conveyor and the stone. The coating is thus dried and the reflective glass beads are "fixed" onto the surface of the coated stone. Since the color coating may be any desired color, the reflective glass beads will reflect a light of similar color. The completed stone is delivered by the conveyor 105 to a storage bin 110.

It will be obvious to those skilled in the art that several portions of the embodiment chosen for illustration utilize commercially available equipment and a complete description of such equipment is therefore unnecessary.

I claim:

1. Apparatus for applying a color coating and reflective glass beads to stone, comprising: a conveyor for conveying stone to be coated from a storage area to a coating area; a compartmentalized rotating drum inclined from horizontal having the higher end thereof open for receiving stone to be coated from said conveyor, each compartment separated from adjacent compartments by discs having openings in the center thereof to permit passage of stone from one compartment to another; blower means for providing hot air in said higher end to dry and heat said stone; a first coating compartment having a coating spray head non-rotatably supported therein and positioned to direct a coating spray upon stone being tumbled therein by the rotation of said drum; a second coating compartment adjacent to said first coating compartment for receiving stones from said first coating compartment and having a glass bead spray head non-rotatably supported therein and positioned to direct a glass bead spray upon stone being tumbled therein by the rotation of said drum; a temperature responsive element positioned in said first coating compartment responsive to the temperature therein for providing control signals; and means connected to said blower responsive to said control signals for controlling the hot air being provided to said rotating drum to maintain the temperature of the stone in said first coating compartment within a predetermined range of temperatures.

2. The combination set forth in claim 1 wherein said compartmentalized rotating drum includes a drying compartment adjacent said first coating compartment and wherein said drying compartment includes means defining a plurality of openings in the periphery of said compartment to permit air to escape from said compartment.

3. The combination set forth in claim 1 including a glass bead storage bin connected by a conduit to an air-carrying glass bead delivery tube, and wherein blower means provides an air volume to said glass bead delivery tube to capture and transport glass beads for delivery to said second coating compartment.

4. The combination set forth in claim 1 including a drier conveyor positioned adjacent the lower end of said second coating compartment to receive coated and beaded stones and deliver said stones to a storage area.

5. The combination set forth in claim 2 wherein a glass bead storage bin is connected by a conduit to an air-carrying glass bead delivery tube, and wherein blower means provides an air volume to said glass bead delivery tube to capture and transport glass beads for delivery to said second coating compartment.

6. The combination set forth in claim 2 wherein a drier conveyor is positioned adjacent the lower end of second coating compartment to receive coated and beaded stones and deliver said stones to a storage area.

References Cited

UNITED STATES PATENTS

| 2,601,355 | 6/1952 | Wyss et al. | 118—303 X |
| 2,639,269 | 5/1953 | Dube | 118—303 X |

WALTER A. SCHEEL, *Primary Examiner.*

JOHN P. McINTOSH, *Assistant Examiner.*

U.S. Cl. X.R.

118—303, 308, 66